United States Patent
Ananthapadmanabh et al.

(10) Patent No.: US 11,487,750 B2
(45) Date of Patent: *Nov. 1, 2022

(54) DYNAMICALLY OPTIMIZING FLOWS IN A DISTRIBUTED TRANSACTION PROCESSING ENVIRONMENT

(71) Applicant: INTERNATIONAL BUSINESS MACHINES CORPORATION, Armonk, NY (US)

(72) Inventors: Madhu B. Ananthapadmanabh, Bangalore (IN); Nageswararao V. Gokavarapu, Bangalore (IN); Jithesh Moothoor, Bangalore (IN); Raghavendran Srinivasan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 590 days.

This patent is subject to a terminal disclaimer.

(21) Appl. No.: 16/548,059

(22) Filed: Aug. 22, 2019

(65) Prior Publication Data

US 2019/0377725 A1    Dec. 12, 2019

Related U.S. Application Data

(63) Continuation of application No. 15/365,235, filed on Nov. 30, 2016, now Pat. No. 10,552,409.

(51) Int. Cl.
*G06F 16/00* (2019.01)
*G06F 16/23* (2019.01)
*G06F 9/46* (2006.01)

(52) U.S. Cl.
CPC ......... *G06F 16/2379* (2019.01); *G06F 9/466* (2013.01); *G06F 16/2365* (2019.01)

(58) Field of Classification Search
CPC ..................... G06F 16/2379; G06F 16/2365
See application file for complete search history.

(56) References Cited

U.S. PATENT DOCUMENTS

| | | | |
|---|---|---|---|
| 5,363,505 A * | 11/1994 | Maslak | G06F 9/466 710/200 |
| 7,712,096 B2 | 5/2010 | Kaczynski et al. | |
| 7,725,432 B2 | 5/2010 | Barnes et al. | |
| 8,041,690 B2 | 10/2011 | Newport et al. | |
| 8,838,534 B2 | 9/2014 | Fowler | |

(Continued)

OTHER PUBLICATIONS

List of IBM Patents or Patent Applications Treated as Related dated Aug. 22, 2019, 2 pages.

*Primary Examiner* — Cheryl Lewis
(74) *Attorney, Agent, or Firm* — Tutunjian & Bitetto, P.C.; Scott Dobson

(57) ABSTRACT

Methods and systems for distributed transaction processing include assigning portions of a logical unit of work to one or more transaction participants. Resource usage information relating to the portions of the logical unit of work is tracked from the respective one or more transaction participants. A last participant is determined based on the tracked resource usage information using a processor. The logical unit of work is resolved. Resolving the logical unit of work includes sending a prepare flow to each of the transaction participants except the last participant to optimize resolution efficiency.

17 Claims, 6 Drawing Sheets

(56) References Cited

U.S. PATENT DOCUMENTS

| 9,055,065 B2 | 6/2015 | Little |
| 2007/0005640 A1* | 1/2007 | Klein .................... G06F 9/466 |
| 2007/0143299 A1 | 6/2007 | Huras et al. |
| 2007/0168351 A1 | 7/2007 | Fachan |
| 2008/0059468 A1* | 3/2008 | Bender .............. G06F 16/2453 |
| 2012/0166407 A1 | 6/2012 | Lee et al. |
| 2013/0024863 A1 | 1/2013 | Parkinson et al. |

* cited by examiner

DYNAMICALLY OPTIMIZING FLOWS IN A DISTRIBUTED TRANSACTION PROCESSING ENVIRONMENT

TECHNICAL FIELD

The present invention generally relates to distributed processing systems and, more generally, to optimizing flows based on an identification of the last participant.

DESCRIPTION OF THE RELATED ART

In complex n-tier processing architectures, a logical unit of work (LUW) can span across multiple resource managers (RMs) and multiple transaction processing monitors (TPMs). These RMs and TPMs may be spread across different geographies and heterogeneous systems. Maintaining data consistency in a complex architecture can be achieved using, e.g., the X/Open Distributed Transaction Processing Standard, also known as the "XA standard." The XA standard specifies that the TPM that initiates a transaction acts as a transaction coordinator and uses two-phase commit to ensure data consistency.

Two-phase commit incurs an overhead as it involves two separate flows before data is moved to a consistent state: preparing to commit and commit/rollback. This process may be optimized. In one particular optimization, a last participant is designated and the "prepare" flow is not sent to the last participant. Choosing a last participant is generally performed manually and is not straightforward, as each TPM may manage multiple resources.

SUMMARY

A method for distributed transaction processing includes assigning portions of a logical unit of work to one or more transaction participants. Resource usage information relating to the portions of the logical unit of work is tracked from the respective one or more transaction participants. A last participant is determined based on the tracked resource usage information using a processor. The logical unit of work is resolved. Resolving the logical unit of work includes sending a prepare flow to each of the transaction participants except the last participant to optimize resolution efficiency.

A system for distributed transaction processing includes a transaction manager module configured to assign portions of a logical unit of work to one or more transaction participants. A last participant module includes a processor configured to determine a last participant based on tracked usage information relating to the portions of the logical unit of work from the respective one or more transaction participants. The transaction manager module is further configured to resolve the logical unit of work and to send a prepare flow to each of the transaction participants except the last participant to optimize resolution efficiency.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention select a last participant dynamically based on feedback received from monitoring resource management. Every transaction processing manager (TPM) includes a resource manager monitor that keeps track of this feedback, and the coordinating TPM determines the last participant.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
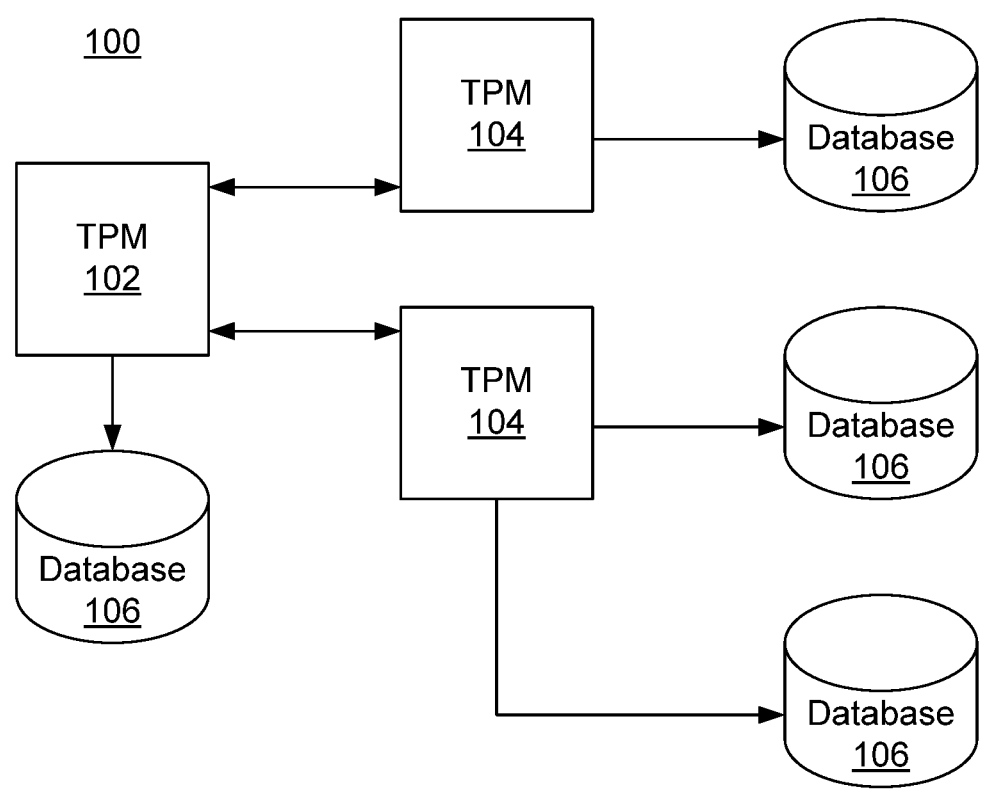
FIG. 1 is a block diagram of a distributed processing system in accordance with the present principles.

Referring now to FIG. 1, a general overview of a processing system 100 is shown. A first TPM 102 acts as the transaction coordinator while one or more additional TPMs 104 act under the direction of the transaction coordinator 102. The additional TPMs 104 act as transaction participants, performing one or more part of the logical unit of work (LUW). Each TPM acts as, or communicates with, a resource manager to one or more databases 106. Every TPM may have multiple resources associated with it, though not every resource will necessarily participate in every LUW. Each TPM therefore tracks which resources participate in each LUW, including properties for the transaction and transactional metadata. Some tracked resource parameters include, e.g., network latency, whether the resource is read-only, etc. All of the tracked parameters are aggregated and sent to the transaction coordinator 102 as part of the transaction payload. Every participant is monitored for every LUW, and a last participant is picked dynamically based on the feedback from the resource monitors. The processing system 100 may be implemented in a cloud computing environment or, alternatively, in a centralized computing cluster or other appropriate arrangement.

Within the specific context of the X/Open Distributed Transaction Processing Standard (XA standard), the two primary flows in a TPM-to-resource or TPM-to-TPM interaction are a transaction flow and a SYNCPOINT flow. A job is executed as part of the transaction flow and may include, for example, a distributed program link, the invocation of an external program resource, etc. The coordination between the transaction coordinator 102 and the participating TPMs 104 occurs during the SYNCPOINT flow.

Many business applications are written using older languages, such as COBOL, C, or PL/I. In some cases, these applications have been running in TPM environments for decades. Because new programmers are trained in more modern skills, proficiency in these older languages is waning. Therefore, businesses develop new enhancements for their older applications in other languages. The legacy components continue to run in their original environments, while the new components run in language environments suited to their respective languages.

Extending existing business logic into a new environment can benefit from propagating transaction context through, for example, two-phase XA coordination. In one specific example, in the context of a mobile recharge application, the mobile recharge service, authentication service, and billing may be developed in JAVA®. The payment gateway and promotional service, meanwhile, may be written in a legacy language. To perform a mobile recharge, the requested LUW would execute the user authentication service (deployed in JAVA®), the promotional reward service (deployed in a legacy language), the payment gateway service (deployed in the legacy language), and the billing service (deployed in JAVA®). In this scenario, the transaction context is propagated as needed, and application components call one another despite language differences. Selection of the last participant in this transaction helps speed resolution, as the last participant need not be provided with the "prepare" flow.

Figure 2:
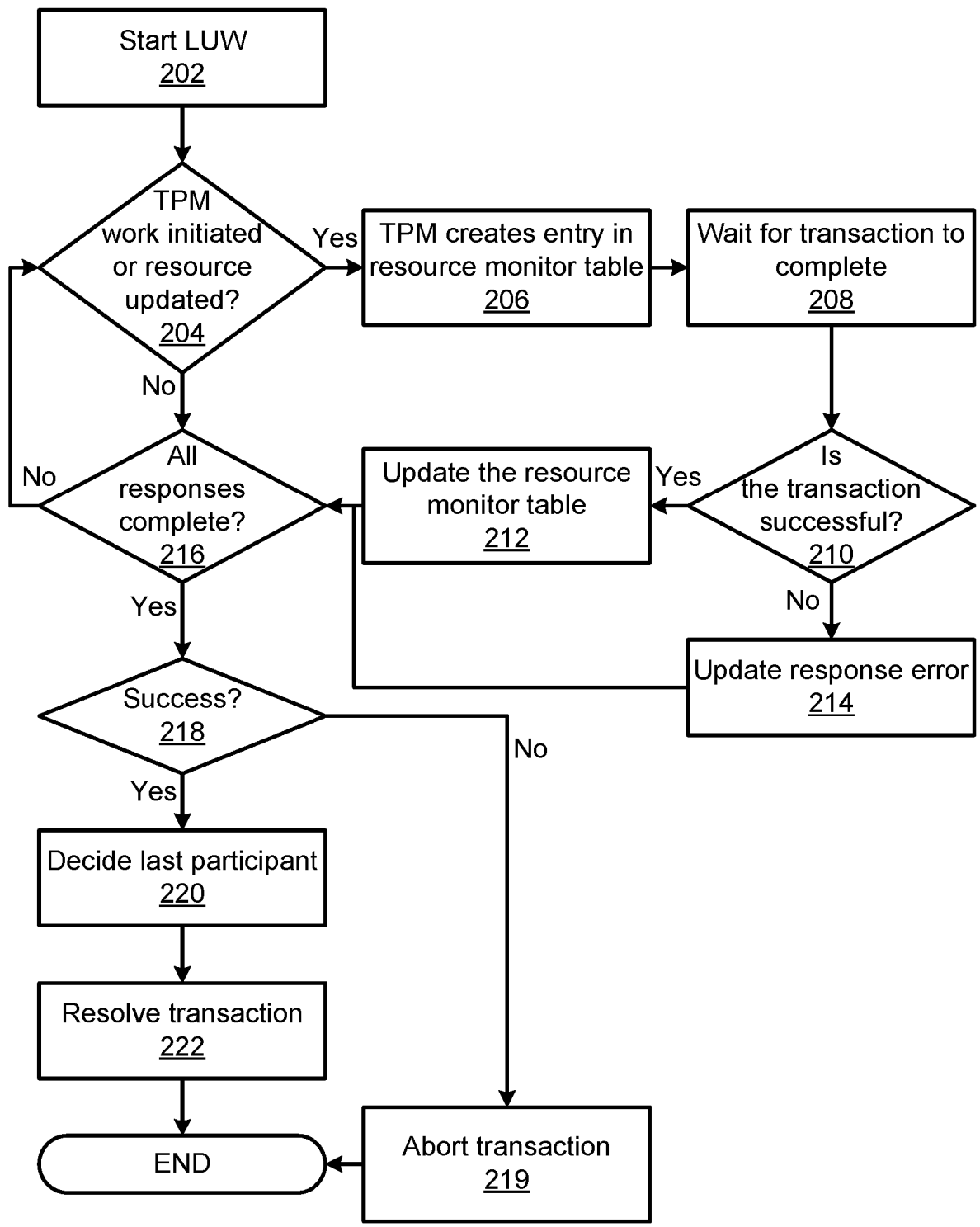
FIG. 2 is a block/flow diagram of a method of distributed processing with dynamic last participant selection in accordance with the present principles.

Referring now to FIG. 2, a method of selecting a last participant is shown. Block 202 begins the logical unit of work, initiating a transaction at a first TPM 102, which becomes the transaction coordinator. Block 204 determines whether a remote TPM 104 has initiated work or, alternatively, if a recoverable resource has updated. If so, block 206 creates an entry in the resource monitor table for the TPM in question. Block 208 then waits for the transaction to complete.

Upon completion of the transaction, if block 210 determines that the transaction is successful, block 212 updates the resource monitor table with tracked quantities such as, e.g., the network latency, the number of resource updates, etc. If the transaction was not successful, block 214 generates an error and the resource monitor information is not transmitted to the transaction coordinator 102. Block 216 determines if all of the responses are complete. If not, processing returns to block 204 and a next transaction is selected. If so, block 218 determines whether the transaction was successful. If not, block 219 aborts the transaction.

If the transaction was successful, block 220 decides the last participant based on scores that consider the responses from the resource monitors. The determination of the last participant includes an analysis of the resource monitor responses received from all of the TPM participants 104. The TPM that is selected has the largest expected latency for transaction resolution. Toward this end, block 220 may calculate scores that directly reflect the time needed for the transaction to resolve at each participant TPM 104. In one example, the score is computed by taking into account the number of participants in a LUW and the responsiveness of the participants. The score is directly proportional to the time taken to resolve a transaction with its participants. In other words, if a participant 104 is connected to multiple resources 106 and other TPMs 104, its score will be relatively high. If the systems are geographically separated from one another, the score is likely to be high because network operations can incur a significant amount of latency. The score can change based on factors that affect response time such as, e.g., network speed, protocol, processing power, etc. The highest score is therefore selected to determine the last participant.

Block 222 then resolves the transaction using the determined last participant information. Part of this resolution is the issuance of prepare flows to the transaction participants 104—a prepare flow is issued to each of the transaction participants 104 except for the determined last participant to increase the efficiency of transaction resolution.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
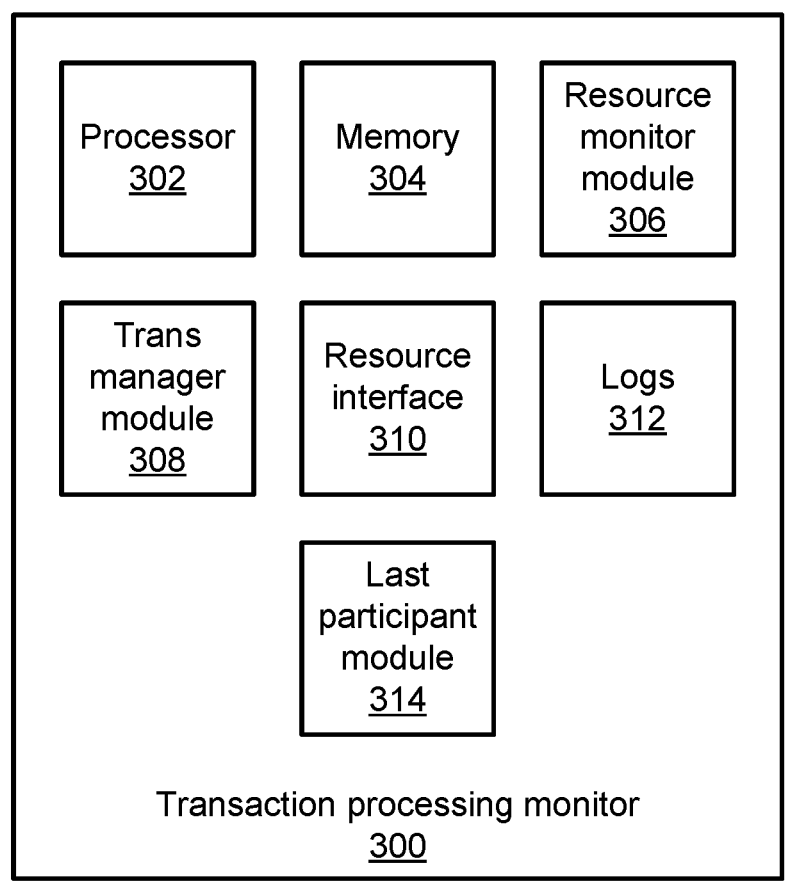
FIG. 3 is a block diagram of a transaction processing monitor in accordance with the present principles.

Referring now to FIG. 3, additional detail on a transaction processing manager 300 is shown. The transaction processing monitor (TPM) 300 described below can represent either the transaction coordinator 102 or the transaction participants 104. It should be understood that, because any TPM 300 may take the role of either the transaction coordinator 102 or the transaction participants 104, depending on where the transaction originates, any given TPM 300 may not employ all of the components described herein while processing a particular LUW. In an alternative embodiment, a dedicated transaction coordinator 102 and dedicated transaction participants 104 may be implemented with only the appropriate components.

Each TPM 300 includes a hardware processor 302 and memory 304. The TPM 300 further includes one or more functional modules. The functional modules may be implemented as software that is stored in memory 304 and executed by hardware processor 302. Alternatively, the functional modules may be implemented as one or more discrete hardware components in the form of, e.g., application-specific integrated chips or field programmable gate arrays.

A resource monitor module 306 tracks the recoverable activity made as part of a transaction's execution. The resource monitor module 306 keeps track of the network latency details with further information regarding the recoverable resource, number of actively participating resources, whether a resource is read-only, and propagation across further TPMs 300. The resource monitor module 306 arrives at a network latency factor using the time taken for calls (e.g., xa_open) and the resolution of TPM upcalls with the same resource in previous instances. The resource monitor module 306 also includes the network latency involved in communication with further TPMs 300. The collected data is sent to the transaction coordinator 102 with the transaction response.

Transaction manager module 308 provides transaction properties, particularly atomicity, consistency, isolation, and durability, and stores the transactional metadata in transactional logs 312 in memory 304 to maintain data integrity. Resource interface 310 implements the specific system calls needed to perform resource operations. It should be understood that the resource in question is considered herein to be, for example, a database or queue stored in one or more memory that may be internal to the TPM 300 or implemented in a separate device. However, it should be understood that the resources in question may be any memory-based resource, processor-based resource, or any other resource that may be used in the execution of a LUW.

A last participant module 314 is implemented in particular on the transaction coordinator 102 and analyzes the information gleaned from the resource monitor modules 306 from the transaction participants 104. The last participant module 314 determines a score based on the resource monitor data for all of the transaction participants 104. The flow with the maximum score is expected to take the maximum amount of time to resolve the transaction and the TPM 300 with the highest score is chosen as the last participant.

Figure 4:
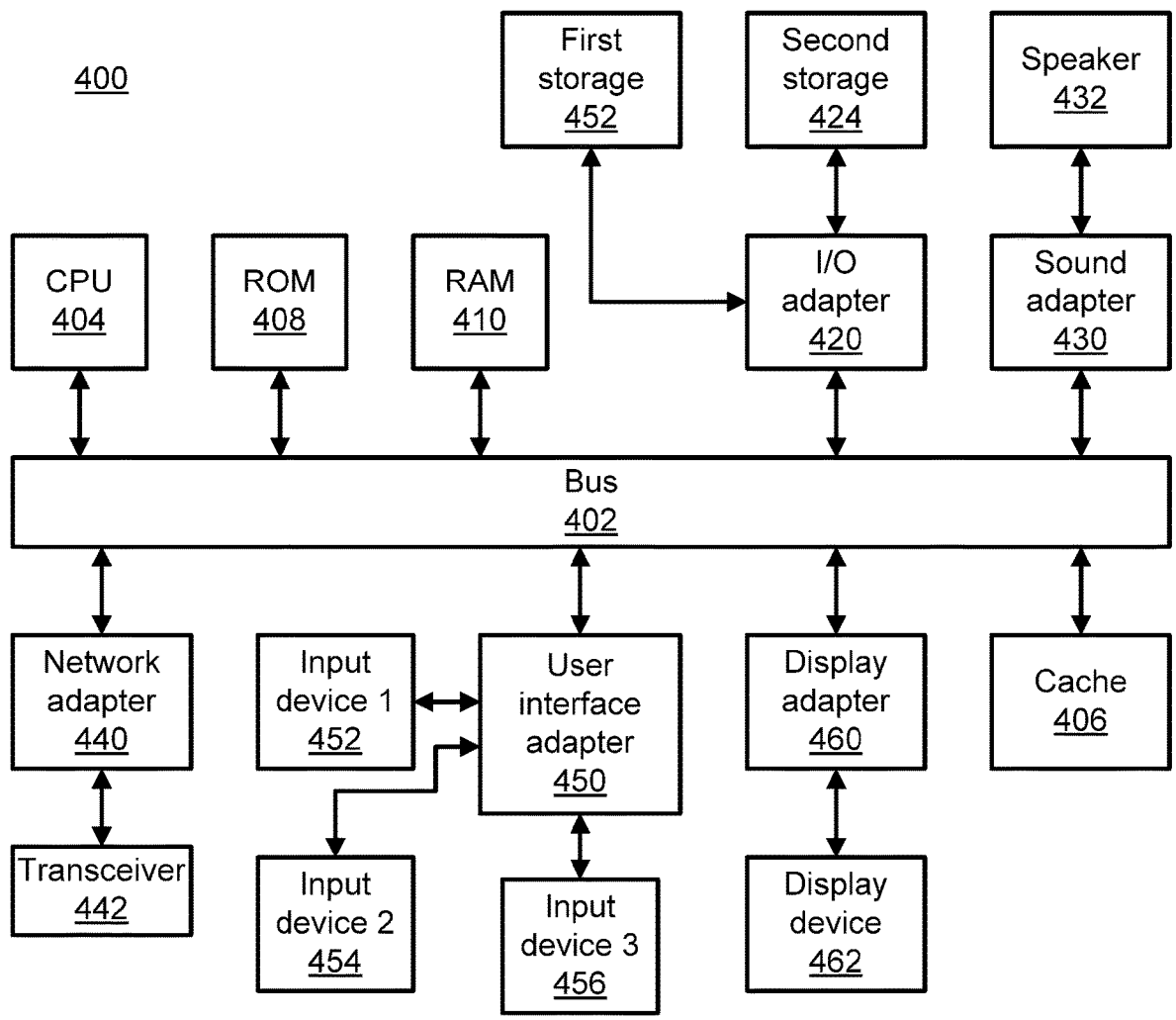
FIG. 4 is a block diagram of a processing system in accordance with the present principles.

Referring now to FIG. 4, an exemplary processing system 400 is shown which may represent the TPM 300. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
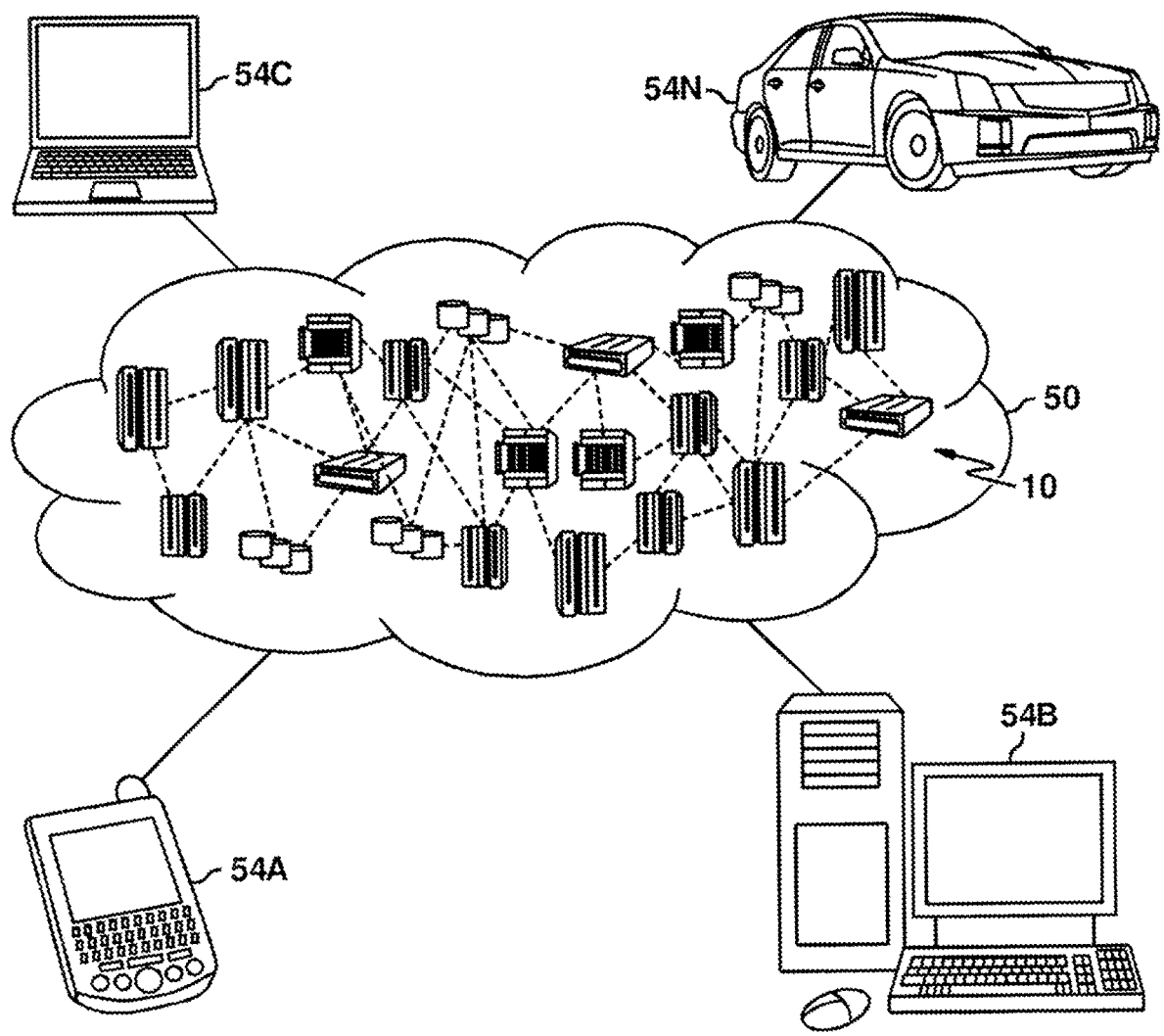
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
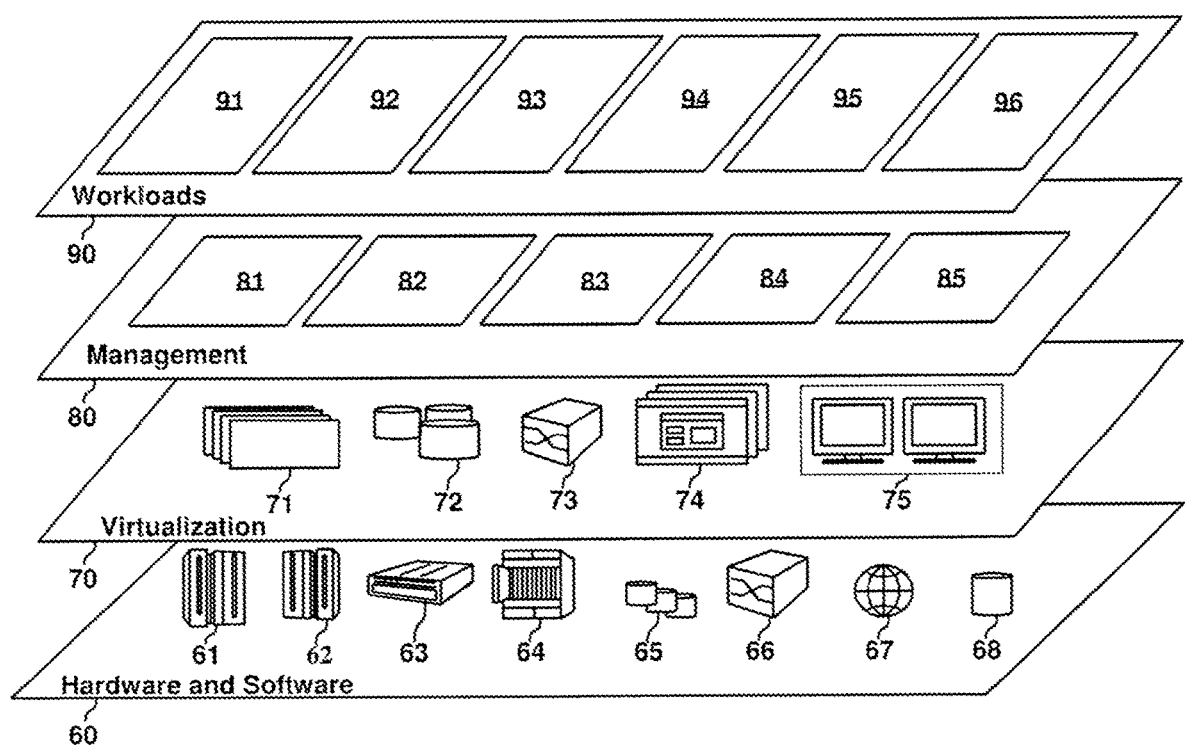
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of logical work units 96.

Having described preferred embodiments of dynamically optimizing flows in a distributed transaction processing environment (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for distributed transaction processing, comprising:
    tracking resource usage information relating to portions of a logical unit of work from respective transaction participants;
    determining a last participant based on the tracked resource usage information using a processor; and
    resolving the logical unit of work, comprising sending a prepare flow to each of the transaction participants except the last participant.

2. The computer-implemented method of claim 1, wherein determining the last participant comprises determining a score for each transaction participant based on an expected transaction latency.

3. The computer-implemented method of claim 2, wherein determining the last participant further comprises selecting a score corresponding to a highest expected transaction latency.

4. The computer-implemented method of claim 1, wherein tracking resource usage information comprises measuring resource usage information at respective transaction participants and forwarding the tracked resource usage information to a transaction coordinator.

5. The computer-implemented method of claim 4, wherein determining the last participant is performed at the transaction coordinator.

6. The computer-implemented method of claim 5, wherein the transaction coordinator is implemented in a device distinct from the transaction participants.

7. The computer-implemented method of claim 1, wherein the tracked resource usage information comprises at least one of network latency and whether a resource is read-only.

8. The computer-implemented method of claim 1, wherein each transaction participant is associated with one or more resources and wherein tracking resource information comprises tracking information pertaining to the execution of a portion of the logical unit of work at a respective resource.

9. A computer readable storage medium comprising a computer readable program for distributed transaction processing, wherein the computer readable program when executed on a computer causes the computer to perform the steps of:
   tracking resource usage information relating to portions of a logical unit of work from respective transaction participants;
   determining a last participant based on the tracked resource usage information using a processor; and
   resolving the logical unit of work, comprising sending a prepare flow to each of the transaction participants except the last participant.

10. A system for distributed transaction processing, comprising:
   a last participant module comprising a processor configured to determine a last participant based on tracked usage information relating to portions of a logical unit of work from respective transaction participants, wherein the transaction manager module is further configured to resolve the logical unit of work and to send a prepare flow to each of the transaction participants except the last participant.

11. The system of claim 10, the last participant module is further configured to determine a score for each transaction participant based on an expected transaction latency.

12. The system of claim 11, wherein the last participant module is further configured to select a score corresponding to a highest expected transaction latency.

13. The system of claim 10, wherein the tracked resource usage information comprises a measurement of resource usage information at respective transaction participants collected at a transaction coordinator.

14. The system of claim 13, wherein the last participant module located at the transaction coordinator.

15. The system of claim 14, wherein the transaction coordinator is a distinct device from the transaction participants.

16. The system of claim 10, wherein the tracked resource usage information comprises at least one of network latency and whether a resource is read-only.

17. The system of claim 10, wherein each transaction participant is associated with one or more resources and wherein the tracked resource usage information pertains to the execution of a portion of the logical unit of work at a respective resource.

* * * * *